Oct. 15, 1929.    O. J. KUHLKE    1,731,247
PNEUMATIC TIRE AND PROCESS OF MAKING SAME
Filed Aug. 27, 1926
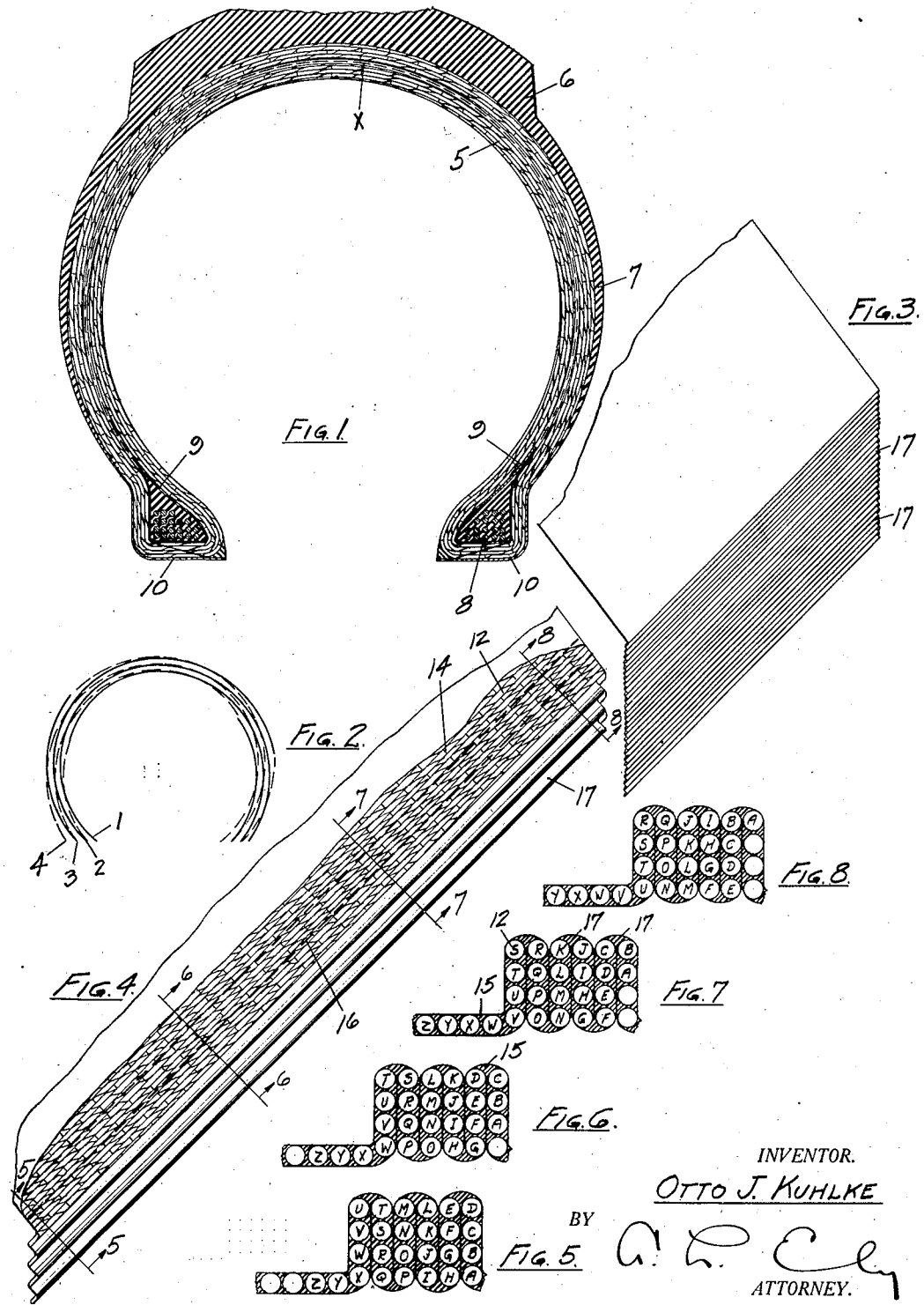
INVENTOR.
OTTO J. KUHLKE
BY
ATTORNEY.

Patented Oct. 15, 1929

1,731,247

UNITED STATES PATENT OFFICE

OTTO J. KUHLKE, OF AKRON, OHIO

PNEUMATIC TIRE AND PROCESS OF MAKING SAME

Application filed August 27, 1926. Serial No. 131,847.

The present invention relates to the construction of pneumatic tires and the process of making the same, the objects of the invention being to improve upon former constructions by the devising of a radically new method of manufacture by which a construction is obtained which is entirely different from previous constructions, as will be explained in the further description of the invention.

The universally used method of manufacturing tires which are now almost exclusively of the cord type, is to apply a plurality of layers of rubberized, cord fabric about a tire core, the fabric being cut on the bias, or at an angle, so that the cords run from points at one bead, across the tire to points on the opposite bead spaced therefrom about the circumference of the tire, the angular arrangement being reversed in various plies. Each layer is applied over the other so that the cords are laid over one another and, as a result, the action of each cord is somewhat restricted by the cords lying over it, so that upon deflection of the tire under load, the several layers, or the cords constituting the several layers, receive unequal bending stresses and loads. There are, therefore, obvious limitations in the manufacture of these tires, particularly in the larger sizes, such as are used in heavy duty service on busses or trucks.

By the method shown and described and in the tire construction resulting therefrom, the several cords of a ply of fabric will occupy different positions in the tire casing so that each cord is more or less an individual strand bearing the load and stresses equally with all the other cords. As a result a longer lived tire is obtained, together with superior resilience and less fatigue and strain in the carcass of the tire.

In the drawings is shown, more or less diagrammatically, the steps of the process and the resulting tire structure, it having been found necessary to show the parts in this manner in order to avoid confusion of lines and to make the invention clear. The rubber coating is omitted in some of the views and certain liberties have been taken in showing the completed structure, which, however, will be clear when taken in conjunction with the description which is given.

The invention as illustrated and described is subject to modifications and variations within the scope thereof, and exact conformity therewith is not essential.

In the drawings:

Figure 1 is a diagrammatic section through a tire manufactured in accordance with the present invention, the view being taken at different angles on either side of the dotted line $x$, as determined by the angular position of the plies above and beneath the beads, this being done to illustrate the structure better;

Figure 2 is a diagrammatic view showing the manner in which the several cords run from one side of the tire to the other;

Figure 3 is a view showing the manner of obtaining the fabric structure which enters into the carcass of the tire;

Figure 4 is an enlarged view at the folding point; and

Figures 5 to 8 inclusive are sections on the respective section lines of Figure 4.

The invention relates to the construction of the carcass or fabric foundation of the tire structure which is indicated at 5, the tread 6, side walls 7 and beads 8 being of any usual or standard construction, the beads being provided with the usual flipper strips 9 and outer chafers 10.

The material which is used in the construction of the tire is the usual cord fabric, composed of a plurality of parallel cords 12 held together by light filler threads 14 spaced at intervals, although these may be omitted if the so-called "weftless cord" fabric is to be used. The fabric is given the usual coating with rubber by any of the well known methods so that the cords are surrounded and covered by a layer of uncured rubber 15. The surfaces of the fabric are sticky and will adhere readily to one another when folded or pleated in the manner to be described.

The coated cord fabric is cut into strips at an angle varying from a right angle to the warp threads in accordance with the results desired. The cut as shown herein is approximately 13° from a right angle, but this angle is not fixed and may be changed in accordance with the width of the fabric and the width of the folds or pleats to be placed in the fabric.

The strip of fabric prepared in the manner set forth is then folded back and forth upon itself into a series of pleats, the adjacent folds adhering to one another by the rubber coating on the fabric. The folds are made along lines 16 shown in Figure 4, these lines passing from one edge of the fabric to the other and crossing a fixed and definite number of warp cords corresponding to the height of the folds and the number of cords desired in a single layer of the folded fabric. Thus, if the equivalent of four plies is desired in each layer of the folded fabric, the line of the fold will cross four cords. If three or five or any number of cords are desired, the angle of the folds will be changed so as to cross the requisite number of threads. It will be noted that the angular position of the pleats or folds 17 will change the general direction of the fabric, as illustrated in Figure 3, and this will cause a consequent shifting of the angular relation of the cords in the fabric so that in final position in the arrangement as shown, the cords will shift to approximately 45° relative to the edge of the pleated or folded fabric. It will also be observed that each individual cord will cross over the folded or pleated fabric in a line diagonal to the plane of the fabric, due to the fact that the pleats are not parallel to the cords. Taking, for example, a cord which will start at the base of a pleat at the left, as, for example, the cord A in Figure 5, that cord will pass upwardly in a diagonal line until, at the right hand side of the pleat, it will be on the top of the pleat and each cord B, C, D, etc. will vary its position in the same manner. This will result in a structure in the tire wherein the several cords pass from a position at one height to positions at different heights around the lines 1, 2, 3 and 4 of Figure 2, which illustrates the manner in which the cords lie over the tire carcass.

When the pleated fabric has been prepared in the manner described, it is shaped into a tire carcass in any of the well known methods employed in the art, the layers of fabric being placed so that their longitudinal edges are parallel to the circumference of the tire. The two layers constituting the tire, one over and one under the bead, are laid with the pleats or folds in opposite directions so as to obtain the desired balancing of the cords. The edges of the fabric being tapered or feathered off will meet below the beads of the tire without increasing the total thickness of the fabric at that point.

The resultant tire structure is a radical departure from any existing tire structure to my knowledge, and its advantages are such that other methods of manufacturing it may be devised, and such methods are intended to be covered in the claims directed to the tire structure. The position and arrangement of the cords secure an equal application of the load to all of the cords and a highly resilient tire is obtained which will reduce the strain upon the casing to a minimum not heretofore obtainable. Variations and modifications in the method of manufacture may also be resorted to without escaping the broad principles of the invention as set forth in the claims hereto appended.

What is claimed is:

1. A method of manufacturing tires comprising forming strips of material containing parallel non-interwoven cords with the cords extending transversely thereof, folding the material in a plurality of pleats obliquely arranged with respect to the cords, and incorporating the pleated material into a tire structure.

2. A method of manufacturing tires comprising forming strips of material containing parallel non-interwoven cords with the cords extending transversely thereof, folding the material in a plurality of pleats obliquely arranged with respect to the strips and crossing a plurality of the cords at an angle, and incorporating the pleated material into a tire structure.

3. A method of manufacturing tires comprising forming strips of material containing parallel non-interwoven cords, folding the material into a series of contiguous pleats along lines angularly arranged with respect to the cords, and incorporating the pleated material into a tire structure.

4. A method of manufacturing tires comprising forming strips of cord fabric, folding the cord fabric into a series of contiguous pleats, the line of folding crossing more than one cord depending upon the height of the pleat desired, and incorporating the pleated layer into a tire structure.

5. A method of manufacturing tires comprising forming strips of cord fabric with the cords extending transversely thereof, folding the fabric in a plurality of pleats obliquely arranged with respect to the strips and crossing the cords, and incorporating the pleated layer into a tire structure with the pleats angularly arranged to the circumference of the tire.

6. A method of manufacturing tires comprising forming strips of cord fabric with the cords extending across the fabric at a relatively small angle, folding the fabric in a plurality of pleats obliquely arranged with respect to the strips and crossing a plurality of the cords at an angle, and incorporating the pleated layer into a tire structure with the pleats angularly arranged to the circumference of the tire.

7. A method of manufacturing tires comprising forming strips of cord fabric, folding the cord fabric into a series of contiguous pleats along lines angularly arranged with respect to the cords, and incorporating the pleated layer into a tire structure with the cords angularly arranged to the circumference of the tire.

8. A method of manufacturing tires comprising forming strips of cord fabric, folding the cord fabric into a series of contiguous pleats, the line of folding crossing more than one cord depending upon the height of the pleat desired, and incorporating the pleated layer into a tire structure with the cords angularly arranged to the circumference of the tire.

9. A method of manufacturing tires comprising forming strips of cord fabric with the cords extending transversely thereof, folding the fabric into a plurality of contiguous pleats obliquely arranged with respect to the strips, and incorporating two of such pleated layers into a tire structure with the pleats and the cords running angularly with respect to the tire structure and in opposite directions in respect to each other.

10. A method of manufacturing tires comprising forming strips of cord fabric with the cords extending transversely thereof, folding the fabric into a plurality of contiguous pleats obliquely arranged with respect to the strips and crossing a plurality of the cords at an angle, and incorporating two of such pleated layers into a tire structure with the pleats and the cords running angularly with respect to the tire structure and in opposite directions in respect to each other.

11. A method of manufacturing tires comprising forming strips of cord fabric, folding the cord fabric into a series of contiguous pleats along lines angularly arranged with respect to the cords, and incorporating two of such pleated layers in a tire structure with the cords in the layers angularly arranged with respect to each other.

OTTO J. KUHLKE.